United States Patent [19]

Schreier et al.

[11] Patent Number: 5,167,296
[45] Date of Patent: Dec. 1, 1992

[54] SAFETY DEVICE FOR VEHICLES

[75] Inventors: Hans-Herbert Schreier, Sindelfingen; Ulrich Tschäschke, Ehningen, both of Fed. Rep. of Germany

[73] Assignee: Mercedes-Benz AG, Fed. Rep. of Germany

[21] Appl. No.: 770,052

[22] Filed: Oct. 4, 1991

[30] Foreign Application Priority Data

Oct. 5, 1990 [DE] Fed. Rep. of Germany ....... 4031552

[51] Int. Cl.$^5$ .................... B60R 21/02; B60J 7/02; B60J 1/12
[52] U.S. Cl. .................... 180/281; 180/286; 180/282; 296/223; 49/26; 318/467
[58] Field of Search .............. 180/281, 282, 286; 296/223; 49/26, 28; 52/66, 45, 1; 318/266, 286, 466, 467, 468, 469, 560, 561, 671

[56] References Cited

U.S. PATENT DOCUMENTS

| 2,909,718 | 10/1959 | Lawick | 318/266 |
| 4,274,226 | 6/1981 | Evans | 49/26 |
| 4,278,922 | 7/1981 | Grebe | 180/281 |
| 4,773,183 | 9/1988 | Okushima et al. | 49/28 |
| 4,835,449 | 5/1989 | Huehn | 318/467 |
| 4,857,813 | 8/1989 | Matsumoto et al. | 318/266 |

FOREIGN PATENT DOCUMENTS

| 0309686 | 4/1987 | European Pat. Off. . | |
| 263058 | 6/1912 | Fed. Rep. of Germany . | |
| 1171285 | 5/1964 | Fed. Rep. of Germany | 296/223 |
| 3120348 | 12/1982 | Fed. Rep. of Germany | 296/223 |
| 3316653 | 12/1983 | Fed. Rep. of Germany | 296/223 |
| 3545874 | 7/1987 | Fed. Rep. of Germany . | |
| 3512117 | 9/1987 | Fed. Rep. of Germany . | |
| 3015836 | 3/1989 | Fed. Rep. of Germany . | |
| 0140612 | 11/1980 | Japan | 296/223 |

Primary Examiner—Margaret A. Focarino
Assistant Examiner—Tamara L. Graysay
Attorney, Agent, or Firm—Evenson, Wands, Edwards, Lenahan & McKeown

[57] ABSTRACT

A safety device is provided for vehicles whose passenger compartment has at least one closable opening, such as a roof opening and side window. The safety device is provided with a sensor system which detects decelerations in the driving speed occurring in the driving direction and activates a closing device assigned to the closing element of the opening if a deceleration exceeds a predetermined value. As a result, in the event of an accident the vehicle occupants are prevented from being thrown out of the vehicle through the opening or injured by the entry of foreign bodies. The closing device is preferably provided with an energy store which, on being activated in the event of a hazard, brings about a rapid closing movement of the closing element.

18 Claims, 1 Drawing Sheet

SAFETY DEVICE FOR VEHICLES

BACKGROUND AND SUMMARY OF THE INVENTION

The invention relates to a safety device for vehicles and, more particularly, to a safety device for motor vehicles whose passenger compartment has at least one opening, such as a roof opening or side window, which can be optionally locked or released by a closing element coupled to a displacement drive. The safety device has a sensor system which detects a situation which adversely affects the safety of the vehicle occupants and triggers the closing movement of the closing element from its open or partially open position. A locking device holds the closing element in its closed position.

In a known safety device of the above-mentioned type, such as in German Patent Document DE 35 12 177 C2, the sensor system responds when the driving speed of the vehicle exceeds a predetermined threshold value and causes the displacement drive to drive the closing element in the closing direction until the opening is completely closed. As a result, the driving safety is prevented from being adversely affected by the increased driving resistance and driving noise occurring at higher driving speeds. However, when driving below the predetermined speed limit, this type of safety device does not prevent the occupants from being thrown out through a non-closed opening. Further, it does not prevent injuries from the entry of the foreign bodies such as branches and stones or by contact with parts outside the vehicle, e.g. the roadway, in the event of a car accident, for example if the vehicle rolls over.

In vehicles with a folding roof, it is known from German Patent Document DE-PS 263 058 to lock the roof folded in the open position with pretensioning and to connect it to a bumper in a detachable manner. The detachable manner operates in such a way that, in the event of an impact of the bumper against an obstacle, the locking is triggered, after which the folding roof is automatically extended. This device assumes the presence of a closing element which is deformable and tensionable per se and, despite a costly and also fault-prone unlocking mechanism, is not effective in all accident situations.

In motor vehicles with roll bars it is already known from German Patent Document DE 35 45 874 C1 to detect vehicle deceleration by means of a sensor and in the event of a predetermined value being exceeded to generate a switching signal which activates a drive device which extends the roll bar. A second sensor detects vehicle inclinations with respect to the X-axis of the vehicle and a third sensor detects the road grip of at least one rear wheel of the vehicle. Both sensors generate corresponding switching signals if the preset values of the vehicle inclinations or of the rebound travel of the rear wheel are exceeded. The switching signals of the, in total, three sensors are logically connected to one another in such a way that the drive device for the roll bar is only activated if at the same time the rear wheel lifts off from the ground and at least one inclination value of the vehicle inclination is exceeded.

From EP 0 309 686 A1 it is also known to generate in a crash situation a control pulse by means of which a support piston of a piston cylinder unit is instantaneously extended and thus a roll bar is moved from a lowered position of rest into a raised supporting position in which it protects the vehicle occupants from injuries if the vehicle rolls over. For the instantaneous extension of the support piston, the roll bar is acted upon by a compression spring acting as an energy store, which is locked in the tensioned state. By means of the control pulse triggered in the crash situation the locking device is deactivated.

In a safety device for motor-vehicle sliding roofs it is known from German Patent Document DE 30 15 836 C2 to prevent the roof cover, which can be driven by means of a displacement drive, from moving into its closed position if there is an obstacle in the region of the roof opening. For this purpose, the safety device has at least one plate-shaped or strip-shaped sensor, which extends at least along a part of the circumference of the roof opening or of the lid cover, and also a detector which cooperates with the latter and responds when the sensor meets an obstacle.

There is therefore needed a safety device, of the above-mentioned type, which in the event of an accident offers a secure protection for the vehicle occupants against injury by foreign bodies, whether by objects from outside the passenger compartment or by the closing of the closing element itself, and in particular against being thrown out of the vehicle passenger compartment.

These needs are met according to the present invention in a safety device for vehicles whose passenger compartment has at least one opening, such as a roof opening or side window, which can be optionally locked or released by a closing element coupled to a displacement drive. The safety device has a sensor system which detects a situation which adversely affects the safety of the vehicle occupants and triggers the closing movement of the closing element from its open or partially open position. A locking device holds the closing element in its closed position. A quick-acting closing device, which is independent of the displacement drive, is provided for the closing element. The sensor system detects the vehicle deceleration in the driving direction and activates the closing device when a preset value of the vehicle deceleration is exceeded and activates the locking device as soon as the closing element reaches its closed position. The sensor system has components for detecting if vehicle occupants are caught in the closing movement of the closing element and, when these components respond, activates in advance the locking device as a stop for limiting the closing movement of the closing element.

The safety device according to the present invention has the advantage that with a suitable selection of the preset value of the vehicle deceleration, the opening is already closed before the vehicle strikes an obstacle. By means of the locking device which is effective in the closed position of the closing element, the closing element is also prevented from being torn out of its guides by inertial forces in which event would place the vehicle occupant's protection again at risk. At the said time, it is ensured that no vehicle occupant can be injured by the closing element which closes the opening if, for whatever reason, parts of the body of a vehicle occupant should already be placed in the opening during the closing movement of the closing element. By simultaneously using the closing device as a stop for limiting the closing movement of the locking element in the event of a vehicle occupant being caught in it, constructional space, construction weight and manufacturing costs of the safety device are reduced.

In an advantageous embodiment of the invention the closing device is provided with an "energy store" which, upon being activated, brings about a rapid closing movement of the closing element. The term "energy store" is to be understood in the broadest sense and should cover both mechanical stores, such as spring energy stores, and pneumatic and hydraulic stores, as well as stores in which the energy is present in the form of chemical bonds, such as for example in drive units of belt tautening devices which are activated pyrotechnically.

If, according to the present invention, the sensor system also detects inclined positions of the vehicle which do not occur during fault-free driving, the closing of the opening can be triggered already at the beginning of a rolling over of the vehicle. The inclined position of the vehicle can be detected, for example, in a known manner by sensors which monitor the road contact of the vehicle wheels. The costs of the safety device can be reduced if sensors are used which are provided for the introduction of other safety measures, e.g. for belt tautening or for controlling a roll bar.

It is a further advantage of the present invention to ensure that the closing device operates satisfactorily even if the displacement of the closing element is subject to increased friction or is provided with a step-down gear.

If the energy store of the closing device is constructed as a spring energy store which can be moved into the loading position by the displacement drive of the closing element during its opening movement, with the arrangement of a coupling in the displacement drive, the advantage is also obtained that the triggering device for the energy store and the decoupling device can be formed by one and the same component.

Other objects, advantages and novel features of the present invention will become apparent from the following detailed description of the invention when considered in conjunction with the accompanying drawings.

DETAILED DESCRIPTION OF THE DRAWINGS

Figure 1:
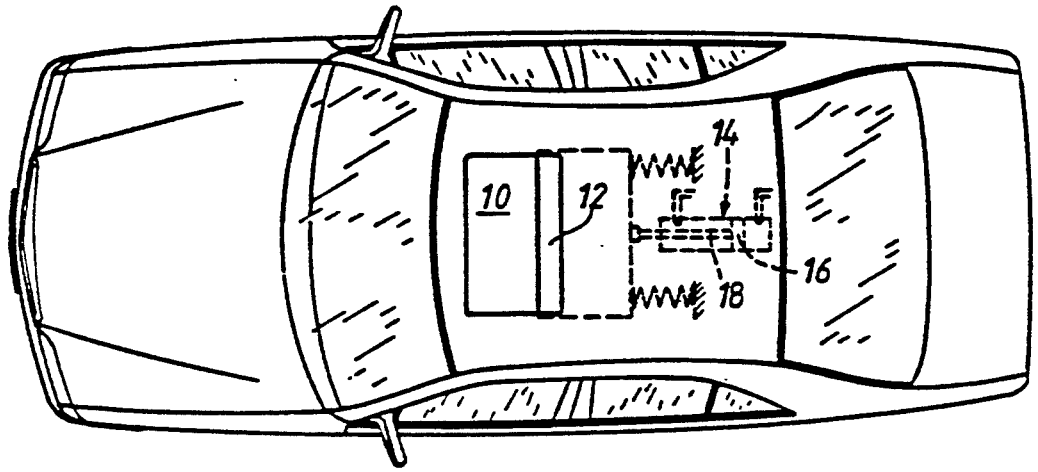
FIG. 1 is a top view of a passenger motor vehicle with a closable roof opening.
Figure 2:
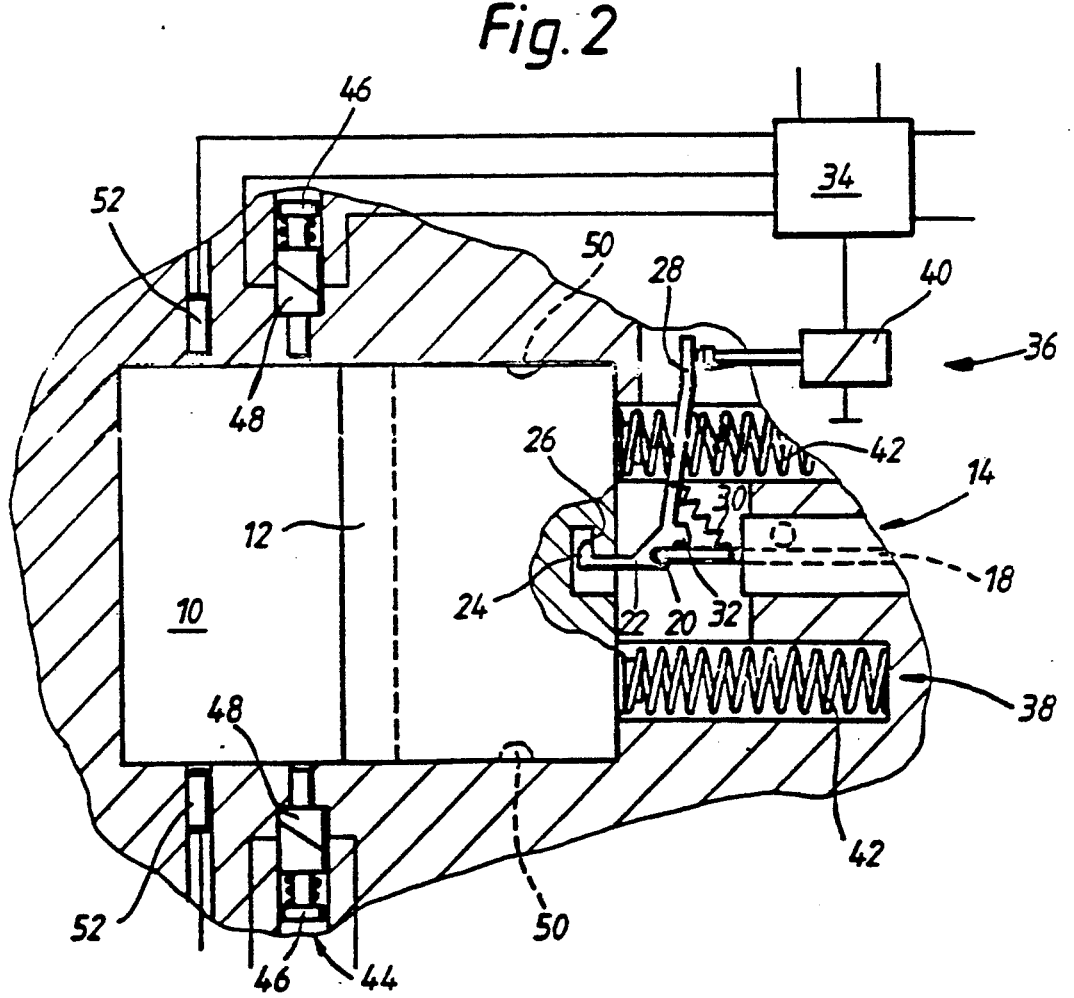
FIG. 2 is a top view of the closing element of the roof opening together with drive and safety device.

Referring to FIG. 1, the passenger motor vehicle has a roof opening 10 which can be closed by means of a roof sliding panel 12 illustrated in the open position in FIGS. 1 and 2. The roof sliding panel 12 is connected to a pneumatic drive 14 with which the roof sliding panel 12 can be intentionally moved by the driver or by the other vehicle occupants into the desired position. The displacement or actuating drive 14 can be fed by a compressed air source present in the vehicle or by an underpressure source. However, for a satisfactory functioning of the exemplary embodiment, a pneumatic actuating drive is not a precondition. Instead of the pneumatic actuating drive, a hydraulic or an electric motor drive could also be provided.

The actuating drive 14 has a piston 16, which can be loaded on both sides, and a piston rod 18 to which a double-armed lever 20 is hinged (omitted in FIG. 1 for the sake of better visibility). The lever 20 along with one lever arm forms a latch 22 which has at the front a chamfered projection 24 which engages behind a corresponding shoulder 26 on the roof sliding panel 12. A tensile spring 30, hinged to the piston rod 18, engages on the other lever arm 28. The tensile spring 30 attempts to swivel the lever 20 in the clockwise direction until an extension 32 on the lever 20 comes to rest against the piston rod 18. In this position, the latch 22 is aligned approximately coaxially with the piston rod 18.

The safety device assigned to the roof opening 10 has a sensor system 34 which is not described individually in greater detail and which by means of inclination sensors and preferably omnidirectional deceleration or acceleration measurement gives indications of an accident risk and, in the given case, activates a closing device 38 with a rapid closing effect by means of a triggering device 36. The triggering device 36 has an electromagnet 40 which is actuated by the sensor system 34 and is capable of acting in the open position of the roof sliding panel 12 on the lever arm 28 in the counterclockwise direction. This swivels the latch 22 away from the corresponding shoulder 26 on the roof sliding panel 12 and interrupts the drive connection between the actuating drive 14 and the roof sliding panel 12.

The closing device 38 has two or more compression springs 42 which, on the one hand are supported on the roof frame and, on the other hand, engage on the roof sliding panel 12 in the closing direction. The two compression springs 42 form an energy store which is loaded when the roof sliding panel 12 is moved into the open position by the actuating drive 14. After the decoupling of the actuating drive 14 by swivelling the latch 22, the compression springs 42, whose tension is released, guide the roof sliding panel 12 into the closed position without delay and with increased acceleration.

In the exemplary embodiment, the electromagnet 40 is illustrated in a stationary position for the sake of simplicity so that the closing device 38 can only be effective in the completely open position of the roof sliding panel. However, the electromagnet 40 could also be movably arranged with the roof sliding panel 12 so that even in its intermediate positions the roof opening 10 is rapidly and forcibly closed when there is the risk of an accident.

When there is the risk of an accident, the sensor system also activates a locking device 44 for the roof sliding panel 12 if, or as soon as, the roof is in the closed position. The locking device 44 has two or more locking bolts 46 which are pulled by electromagnets 48, actuated by the sensor system 34, counter to spring force in locking grooves 50 in the roof sliding panel 12 when the roof panel 12 is in the closed position. If required, the arrangement can also be configured in such a way that the safety lock of the roof sliding panel 12 is automatically raised if the vehicle no longer moves after the closing of the roof opening.

The sensor system 34 finally also activates a stop device for limiting the closing movement of the roof sliding panel 12 if the vehicle occupants could be caught by the rapidly moving roof sliding panel 12.

For this purpose, the sensor system 34 is provided with two electronic components 52 which are arranged opposite one another at a suitable point on the roof opening 10 and form a photoelectric barrier. The stop device can be formed, as in the exemplary embodiment, by the components of the locking device 44. In this case, the electromagnets 48 pull the locking bolts 46 into the path of movement of the roof sliding panel 12 so that the roof sliding panel 12 is caught on the locking bolts 46 and the closing movement can non longer continue. In other embodiments and geometric designs of the roof opening and of the closing device, the stop device can of course also be realized by means of other, separate components for blocking the roof sliding panel 12.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A safety device for vehicles having a passenger compartment with at least one opening which can be optionally locked or released via a closing element coupled to a displacement drive, said safety device comprising:

a sensor system detecting a situation adversely affecting vehicle occupant's safety and triggering a closing movement of said closing element from at least a partially open position;

a locking device for holding said closing element in a closed position;

a quick-acting closing device, independent of said displacement drive, for quickly closing said opening with said closing element;

wherein said sensor system detects vehicle deceleration in a driving direction and activates said quick-acting closing device when a preset value of the vehicle deceleration is exceeded and, activates said locking device as soon as said closing element reaches the closed position;

wherein said sensor system includes components for detecting if vehicle occupants are caught in said closing element and, when said components respond, activates said locking device in advance of the closing of said closing element as a stop for limiting the closing movement of said closing element.

2. Device according to claim 1, wherein said closing element includes locking grooves; and wherein said locking device includes extendable closing bolts which engage in the closed position of said closing element in said locking grooves and project laterally into said opening as a stop for limiting the closing movement of said closing element.

3. Device according to claim 2, further comprising:

an energy store;

wherein said closing device is provided with said energy store as a power source which, on being activated, brings about a rapid closing movement of said closing element.

4. Device according to claim 3, wherein said displacement drive for said closing element has a coupling device, and;

said sensor system for activating said closing device actuates a decoupling device which decouples said coupling device.

5. Device according to claim 2, wherein said sensor system detects inclined positions of the vehicle which do not occur during normal driving.

6. Device according to claim 5, further comprising:

sensors for monitoring road contact of the vehicle wheels in order to detect inclined positions of the vehicle.

7. Device according to claim 1, further comprising:

an energy store;

wherein said closing device is provided with said energy store as a power source which, on being activated, brings about a rapid closing movement of said closing element.

8. Device according to claim 7, wherein said sensor system detects inclined positions of the vehicle which do not occur during normal driving.

9. Device according to claim 8, further comprising:

sensors for monitoring road contact of the vehicle wheels in order to detect inclined positions of the vehicle.

10. Device according to claim 9, wherein said energy store of the closing device is a spring energy store which can be tensioned by the displacement drive for the closing element.

11. Device according to claim 8, wherein said energy store of the closing device is a spring energy store which can be tensioned by the displacement drive for the closing element.

12. Device according to claim 7, wherein said displacement drive for said closing element has a coupling device, and;

said sensor system for activating said closing device actuates a decoupling device which decouples said coupling device.

13. Device according to claim 12, wherein said energy store of the closing device is a spring energy store which can be tensioned by the displacement drive for the closing element.

14. Device according to claim 7, wherein said energy store of the closing device is a spring energy store which can be tensioned by the displacement drive for the closing element.

15. Device according to claim 1, wherein said sensor system detects inclined positions of the vehicle which do not occur during normal driving.

16. Device according to claim 15, further comprising:

sensors for monitoring road contact of the vehicle wheels in order to detect inclined positions of the vehicle.

17. Device according to claim 16, wherein said displacement drive for said closing element has a coupling device, and;

said sensor system for activating said closing device actuates a decoupling device which decouples said coupling device.

18. Device according to claim 15, wherein said displacement drive for said closing element has a coupling device, and;

said sensor system for activating said closing device actuates a decoupling device which decouples said coupling device.

* * * * *